United States Patent
Lo Presti (10) Patent No.: US 9,450,227 B2
(45) Date of Patent: Sep. 20, 2016

(54) THERMOSTATIC VALVE FOR AN ELECTROCHEMICAL POWER SOURCE FOR USE IN A MARINE ENVIRONMENT

(71) Applicant: WHITEHEAD SISTEMI SUBACQUEI S.p.A., Rome (IT)

(72) Inventor: Francesco Lo Presti, Rome (IT)

(73) Assignee: Whitehead Sistemi Subacqueri S.P.A., Rome (IT)

( * ) Notice: Subject to any disclaimer, the term of this patent is extended or adjusted under 35 U.S.C. 154(b) by 0 days.

(21) Appl. No.: 14/935,234

(22) Filed: Nov. 6, 2015

(65) Prior Publication Data
US 2016/0133915 A1    May 12, 2016

(30) Foreign Application Priority Data
Nov. 7, 2014    (IT) .............................. TO2014A0927

(51) Int. Cl.
| H01M 2/38 | (2006.01) |
| B63G 8/00 | (2006.01) |
| H01M 6/34 | (2006.01) |
| G05D 11/16 | (2006.01) |

(52) U.S. Cl.
CPC ................ H01M 2/38 (2013.01); B63G 8/00 (2013.01); G05D 11/16 (2013.01); H01M 6/34 (2013.01); H01M 2220/20 (2013.01)

(58) Field of Classification Search
CPC .................................. B63G 8/00; H01M 2/38
USPC ............ 114/212; 236/12.11–12.12; 429/107
See application file for complete search history.

(56) References Cited

U.S. PATENT DOCUMENTS

| 3,929,283 | A | * | 12/1975 | Delpla | ............... | G05D 23/1353 236/12.2 |
| 4,819,867 | A | * | 4/1989 | Delpla | ............... | G05D 23/1353 236/12.16 |
| 5,462,224 | A | * | 10/1995 | Enoki | ................ | G05D 23/1353 137/606 |
| 6,155,212 | A | * | 12/2000 | McAlister | ............... | F02B 43/08 123/25 B |
| 7,448,553 | B2 | * | 11/2008 | Schmitt | ................. | F16K 19/006 236/12.11 |
| 7,475,827 | B2 | * | 1/2009 | Schmitt | ................. | B01F 5/0268 236/12.11 |

(Continued)

FOREIGN PATENT DOCUMENTS

EP        0771979        5/1997

OTHER PUBLICATIONS

Italian Search Report from Italian Application No. TO20140927 dated Jul. 22, 2015.

*Primary Examiner* — Lars A Olson
*Assistant Examiner* — Jovon Hayes
(74) *Attorney, Agent, or Firm* — Dorsey & Whitney LLP (57) ABSTRACT

A thermostatic valve, coupled to an electrochemical power source and having: a valve body; a first fluid inlet for a hot electrolytic fluid; a second fluid inlet for a cold electrolytic fluid; an outlet supplying a mixed electrolytic fluid; and regulating means for adjusting the mixing. The valve body defines a first opening, in communication with the second fluid inlet for the cold electrolytic fluid; and a second opening, in communication with the first fluid inlet for the passage of the hot electrolytic fluid; the regulating means include an adjustment baffle, interposed between the first and second openings and the outlet, and rotatably drivable to vary a useful passage section and adjust the mixing. The first and second openings are designed to mix the electrolytic fluids in different proportions, maintaining the flow rate and introduced load losses unvaried, as the rotation angle of the adjustment baffle varies.

15 Claims, 3 Drawing Sheets

(56) References Cited

U.S. PATENT DOCUMENTS

| | | | | |
|---|---|---|---|---|
| 7,744,007 B2* | 6/2010 | Beagen | ................ | G05D 23/134 137/337 |
| 8,074,894 B2* | 12/2011 | Beagen | .............. | G05D 23/1346 236/12.1 |
| 8,733,666 B2* | 5/2014 | Beagen | ................ | F16K 31/002 236/12.1 |
| 2007/0006571 A1* | 1/2007 | Vetrovec | ................... | F01N 5/02 60/281 |
| 2007/0105460 A1 | 5/2007 | Vivien et al. | | |
| 2007/0246550 A1 | 10/2007 | Rodenbeck et al. | | |

* cited by examiner

THERMOSTATIC VALVE FOR AN ELECTROCHEMICAL POWER SOURCE FOR USE IN A MARINE ENVIRONMENT

The present invention relates to a thermostatic valve for an electrochemical power source for use in a marine environment; in particular, the following description will refer, without any loss of generality, to the use of this thermostatic valve in an underwater vehicle, for example a torpedo or an underwater autonomous vehicle (UAV).

BACKGROUND OF THE INVENTION

In a known manner, an electrochemical power source (a so-called "electrochemical cell") comprises an electrochemical block (or stack), constituted by at least two electrodes, made of metal materials for example, with different electronegative potential, wherein a suitable electrolytic fluid is circulated.

This electrolytic fluid undergoes an increase in temperature when it is inside the electrochemical block, due to the exothermicity of the chemical reactions occurring inside the electrochemical block.

To avoid runaway thermal drift of the system, the electrolytic fluid is then usually extracted from the electrochemical block and cooled via suitable cooling systems, after which it is put back into the electrochemical block again.

Temperature control of the electrolytic fluid that is admitted into the electrochemical cell represents an important parameter for the correct operation of the power source, since, for example, it is correlated to the generated electrical power.

The use of a regulation system, which comprises a heat exchanger, two tanks designed to contain electrolytic fluid and a thermostatic valve, has therefore been proposed to implement temperature regulation of the electrolytic fluid.

In particular, electrolytic fluid at a higher temperature, defined as "hot", such as that taken from the electrochemical block is poured into a first tank; a second tank, instead, contains electrolytic fluid at a lower temperature (defined as "cold"), obtained by opportunely cooling hot electrolytic fluid, which is made to flow through the heat exchanger.

The thermostatic valve has a first and a second inlet, respectively connected to the first and to the second tank, an outlet connected to a fluid inlet of the electrochemical block, and regulating means operable to control mixing of the hot electrolytic fluid and cold electrolytic fluid to be supplied to the electrochemical block, so as to adjust the temperature of the mixed electrolytic fluid.

However, the Applicant has found that design of this thermostatic valve poses some problems, in particular related to the variability of the operating conditions to which it might be subjected, for example, for different depths of use of the underwater vehicle, which could entail a corresponding variability in the circuit parameters at the inlet of the electrochemical block and therefore compromise the expected performance.

SUMMARY OF THE INVENTION

The object of the present invention is to provide an improved thermostatic valve that totally or at least partially enables overcoming the problems and limitations associated with known solutions.

According to the present invention, a thermostatic valve and an associated electrochemical power source are thus provided, as defined in the appended claims.

BRIEF DESCRIPTION OF THE DRAWINGS

For a better understanding of the present invention, some preferred embodiments will now be described, purely by way of a non-limitative example and with reference to the accompanying drawings, in which.

DETAILED DESCRIPTION OF THE INVENTION

Figure 1:
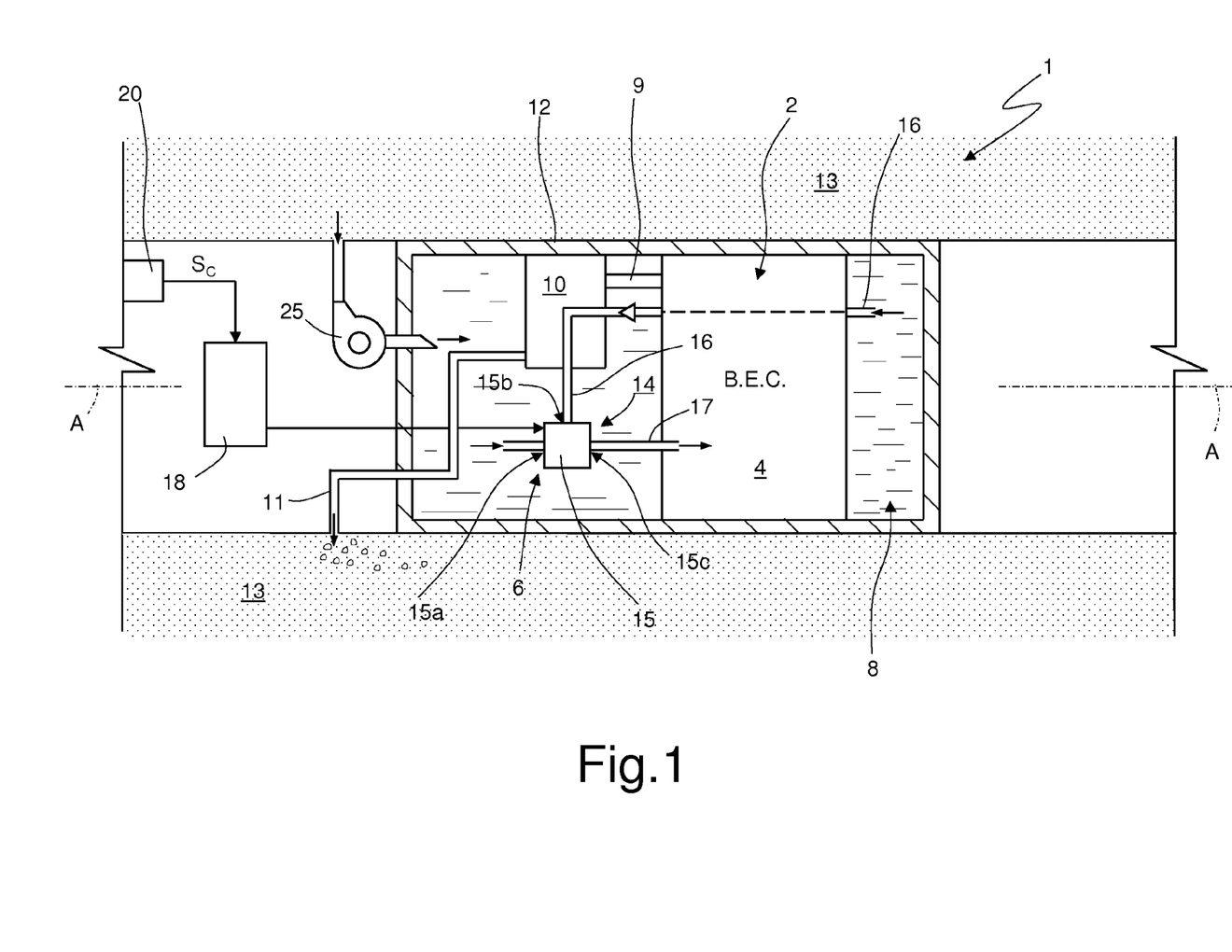
FIG. 1 is a simplified block diagram of a portion of an underwater vehicle, provided with an electrochemical power source and a thermostatic valve for controlling the temperature of the electrolyte.

Referring to FIG. 1, reference numeral 1 indicates an underwater vehicle in general, such as, for example, a torpedo or an underwater autonomous vehicle (UAV).

The underwater vehicle 1 comprises a tubular body, with a longitudinal extension axis A and having a central section inside which a chamber 2, housing an electrochemical block (BEC) 4, is defined.

The electrochemical block 4 provides electrical power to a propulsion engine of the underwater vehicle 1 (not shown here) and/or to onboard electronic equipment (this also not shown). In particular, during operation, the electrochemical block 4 is filled with sea water, acting as an electrolytic fluid, to cause corresponding chemical reactions for power generation.

In a position adjacent to the chamber 2, the central section of the underwater vehicle 1 has a first tank 6 (in front of the chamber 2 with respect to the longitudinal axis A) and a second tank 8 (behind the chamber 2 with respect to the longitudinal axis A), intended to contain an electrolytic fluid at a higher temperature (hot) and, respectively, an electrolytic fluid at a lower temperature (cold).

In particular, at least in certain operating conditions, a recirculation duct 9 places the chamber 2 containing the electrochemical block 4 in communication with the first tank 6 in such a way that hot electrolytic fluid, taken from inside the electrochemical block 4, enters the first tank 6. Preferably, a separator 10 of the fluid phase to gas phase type is also present, interposed between the end of the recirculation duct 9 that connects to the chamber 2 and the same chamber 2; the separator 10 extracts reaction gases, mainly hydrogen ($H_2$), from the electrolyte leaving the chamber 2, and transfers them outside of the underwater vehicle 1, via a gas discharge pipe 11.

Part of the hot electrolytic fluid is also opportunely directed from the chamber 2 to a heat exchanger 12, which is constituted by an interspace made in the central section of the underwater vehicle 1 and having an outer wall directly in contact with the sea water outside the underwater vehicle 1, indicated by reference numeral 13. After it has been cooled by the heat exchanger 10, the electrolytic fluid reaches the second tank 8.

In particular, a thermostatic valve 14 enables mixing, in the desired quantity, cold electrolytic fluid coming from the second tank 8 with hot electrolytic fluid in the first tank 6, and introducing the mixed fluid, at a desired and controlled temperature, inside the chamber 2, effectively implementing a recirculation system.

In the embodiment shown in FIG. 1, the thermostatic valve 14 is arranged inside the first tank 6, immersed in the hot electrolytic fluid.

Figure 2:
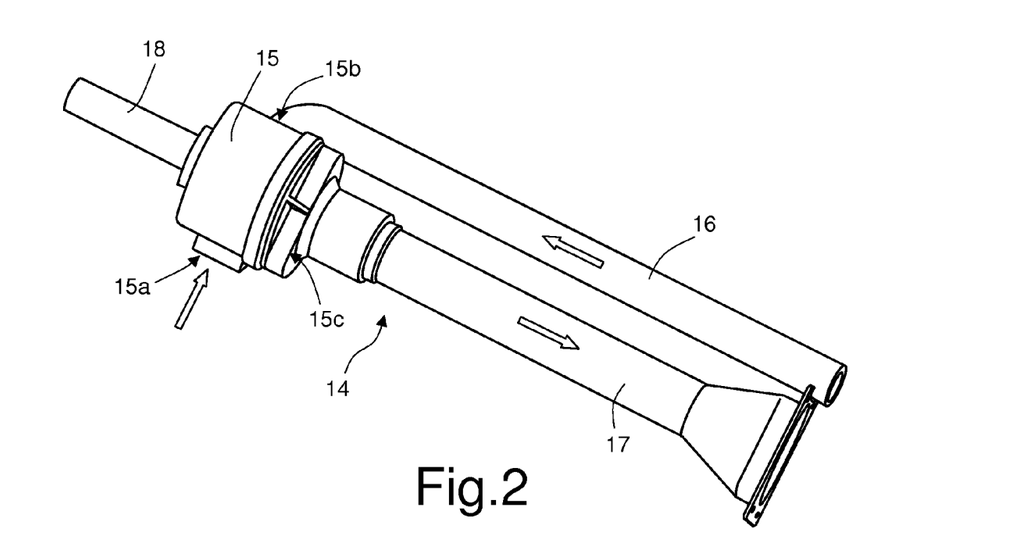
FIG. 2 is a perspective view of the thermostatic valve in FIG. 1, according to an embodiment of the present invention.

As also shown in FIG. 2, the thermostatic valve 14 comprises a valve body 15 and has: a first fluid inlet 15a, for the intake of hot electrolytic fluid, at a first temperature; a second fluid inlet 15b, for the intake of cold electrolytic fluid, at a second temperature, lower than the first temperature; and a fluid outlet 15c, from which mixed electrolytic fluid at a third temperature, adjusted to a desired value, is supplied.

In the embodiment shown, the first fluid inlet 15a is a radial opening in fluid communication with the first tank 6, through the interposition of a suitable filter element (not shown), so as to receive the hot electrolytic fluid that is generated following the exothermic chemical reactions in the electrochemical block 4 and which is extracted from the same electrochemical block 4; the second fluid inlet 15b, of a radial type, is fluidically connected to the second tank 8 by a connecting duct 16, which places the second tank 8 in communication with the first tank 6, so as to receive the electrolytic fluid suitably cooled by the heat exchanger 12; and the fluid outlet 15c is placed in a frontal position with respect to the valve body 15 and is fluidically connected to an inlet of the electrochemical block 4, to supply the mixed electrolytic fluid, at a desired temperature, which is re-inserted into the electrochemical block 4, through an outlet duct 17.

The thermostatic valve 14 also comprises an actuator 18, for example including or cooperating with an electric motor, or motor reducer, and designed to operate regulating means (described in detail below), carried by the thermostatic valve 14, to vary the mixing of the hot and cold electrolytic fluids and so adjust the temperature of the electrolytic fluid supplied at the fluid outlet 15c.

An electronic control module 20, comprising a processing unit based on a microcontroller (or microprocessor, digital signal processor (DSP), or similar digital processing unit), is configured to provide a control signal $S_c$ to the actuator 18 of the thermostatic valve 14, so as to obtain a desired adjustment of the electrolytic fluid at the fluid outlet 15c.

In addition, a temperature sensor (not shown), for example a thermocouple, is attached to the fluid outlet 15c, to detect the output temperature of the electrolytic fluid resulting from the mixing performed by the thermostatic valve 14; and a position sensor (also not shown) is attached to the regulating means of the thermostatic valve 14, to detect an actuation position (for example, a rotation position).

The electronic control module 20 receives at its input the signals detected by the temperature sensor and/or position sensor and/or further sensors (not shown) and, in addition, a time-varying reference signal, for example by means of a digital interface, such as a data communications bus, for example a CAN (Controller Area Network) bus. The reference signal represents, instant by instant, a target value for the above-mentioned output temperature and/or a value of a quantity associated with this output temperature (for example, a desired electrical power output that must be supplied by the electrochemical power source).

The above-mentioned reference signal is generated, for example, by a main electronic control unit (not shown here) of the underwater vehicle 1, based, for example, on a desired power output that has to be supplied by the associated power source.

Based on the detected signals and the reference signal, the electronic control module 20 is designed to implement a feedback control loop and vary the mixing of the hot and cold electrolytic fluids by generating an appropriate value for the control signal $S_c$.

In the embodiment shown in FIG. 1, the electronic control module 20 and the actuator 18 are both arranged outside the first tank 6 in an external portion, a so-called "dry" zone, i.e. not in contact with the electrolytic fluid or sea water.

In the above-mentioned external portion, there is also a pump 25, for recirculating the electrolyte, which has an inlet in fluid communication with the environment outside the underwater vehicle 1 and receiving sea water 13, and which also communicates with the first tank 6.

The improved design of the thermostatic valve 14, according to one aspect of the present solution, will now be described in greater detail, and with particular reference to FIG. 3.

The valve body 15 internally defines a first opening 30a, in fluid communication with the second fluid inlet 15b and designed to allow passage of the cold electrolytic fluid; and a second, separate, opening 30b, in fluid communication with the first fluid inlet 15a and designed to allow passage of the hot electrolytic fluid.

The first and second openings 30a and 30b are calibrated, or rather have a respective calibrated section $S_1$ and $S_2$ in a plane orthogonal to a longitudinal axis B of the valve body 15, passing through the geometric centre O of the valve body 15; the geometric shape of these sections $S_1$ and $S_2$ (i.e. the related perimeter or profile) is suitably designed, as described in detail below. In the embodiment shown in FIG. 3, sections $S_1$ and $S_2$ are symmetrical and specular with respect to a diametrical axis of the section of the valve body 15 passing through the centre O.

The first and second openings 30a and 30b merge into the fluid outlet 15c of the thermostatic valve 14, with the interposition of an adjustment baffle 32, which constitutes the regulating means of the thermostatic valve 14.

The adjustment baffle 32 enables choking the openings 30a and 30b, so as to vary the flow rate of a branch, hot or cold, with respect to the other, to obtain a fluid at a desired and controlled temperature at output, which flows to the outlet duct 17.

In particular, the adjustment baffle 32 is designed to rotate about the longitudinal axis B, based on the control signal $S_c$ implemented by the actuator 18 of the thermostatic valve 14, so as vary the useful passage section (indicated hereinafter as $S_{f1}$ and $S_{f2}$) of the openings 30a and 30b, which are therefore variable as a function of the rotation angle, indicated as a, and consequently such as to vary the respective flows of hot and cold electrolytic fluids.

During rotation, the adjustment baffle 32 causes opening of either the first or the second opening 30a or 30b and corresponding closing of the other opening 30b or 30a.

Figure 3:
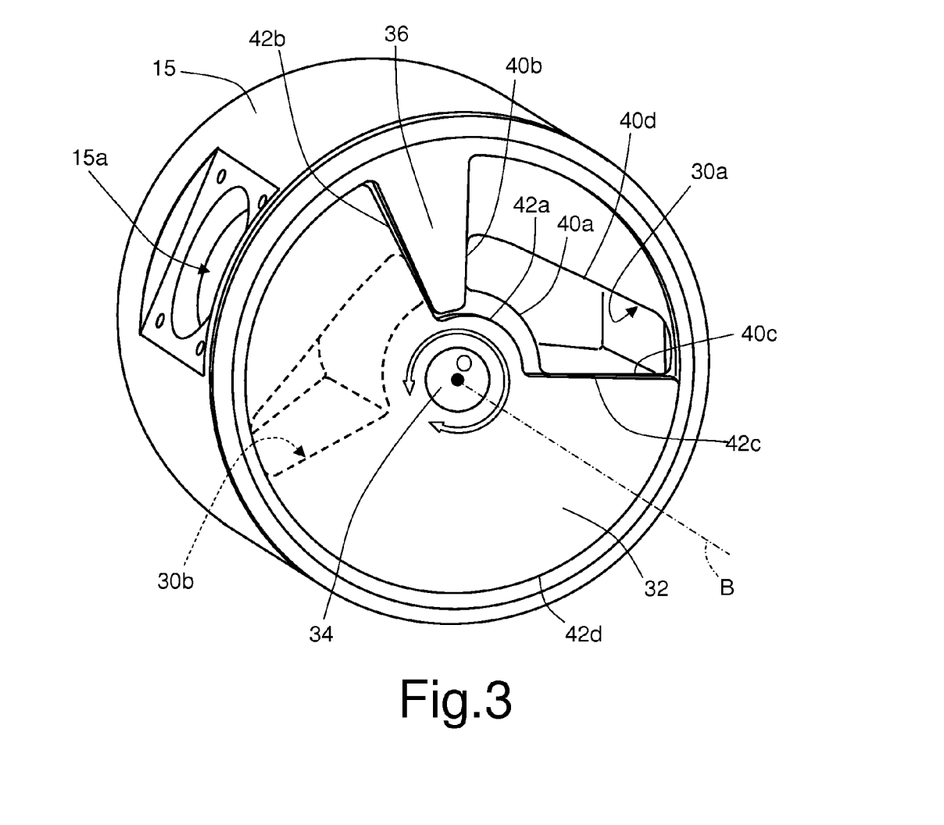
FIG. 3 is a perspective section of the thermostatic valve in FIG. 2.

In the embodiment shown in FIG. 3, the adjustment baffle 32 has a "fan" shape, i.e. a disc portion with an angular extension of between 180° and 270° in the example, preferably close to 270°.

The adjustment baffle 32 is centrally coupled to a rotating shaft 34, driven by the actuator 18, which causes a continuous rotation, between a first angular position, shown in FIG.

3, in which the adjustment baffle 32 completely obstructs the second opening 30b and leaves the first opening 30a completely free, and a second angular position (not shown), in which, on the contrary, it completely obstructs the first opening 30a and leaves the second opening 30b completely free. In the example shown, the angular excursion between the first and second angular positions is 90°.

Clearly, the adjustment baffle 32 may assume any intermediate position between the first and second angular positions, based on the command issued by the actuator 18, in order to establish desired useful passage sections $S_{f1}$ and $S_{f2}$ of the openings 30a and 30b, and so cause a desired mixing of the cold and hot electrolytic fluids.

In greater detail, the adjustment baffle 32 is inserted in a seat defined inside the valve body 15, which also carries a wedge-shaped stop member 36 to stop the rotation of the adjustment baffle 32; the above-mentioned first and second angular positions are determined by abutment of the adjustment baffle 32 against the stop member 36, at opposite lateral walls thereof.

According to one particular aspect of the present solution, the thermostatic valve 14, and in particular the first and second openings 30a and 30b, are designed to allow mixing the hot and cold electrolytic fluids in different proportions, and with different flow rates, while maintaining the outgoing flow rate and load losses introduced into the fluid circuit by the thermostatic valve 14 unvaried, whatever the operating conditions.

In particular, for designing the calibrated openings 30a and 30b in order to maintain the flow rate and load loss values unvaried, the computations described below have been performed, using the hydraulic diagram of the thermostatic valve 14 shown in FIG. 4, where the thermostatic valve 14 is schematized with four hydraulic resistances:
a resistance R1, defining a hydraulic resistance of the circuit branch of the cold electrolytic fluid, formed by the second tank 8, the heat exchanger 12 and the connecting duct 16, which places the second tank 8 in communication with the first tank 6 and with the thermostatic valve 14;
a resistance Rx1, connected in series to resistance R1 between a first node N1 and a second node N2 (which respectively represent an upstream point and a downstream point of the hydraulic circuit with respect to the thermostatic valve 14), and defining a variable hydraulic resistance generated by the useful passage section $S_{f1}$ of the first opening 30a, effectively traversed by the cold electrolytic fluid (this passage section varying according to the regulation of the adjustment baffle 32 and the related rotation angle α);
a resistance R2, defining a hydraulic resistance of the circuit branch of the hot electrolytic fluid, formed by the first fluid inlet 15a, in communication with the first tank 6, and by the associated filter; and
a resistance Rx2 connected in series to resistance R2 between the first node N1 and the second node N2 (the series of resistances R2 and Rx2 also being connected in parallel to the corresponding series of resistances R1 and Rx1), defining a variable hydraulic resistance generated by the useful passage section $S_{f2}$ of the second opening 30b, effectively traversed by the hot electrolytic fluid (this passage section also varying according to the regulation of the adjustment baffle 32 and the related rotation angle α).

Figure 4:
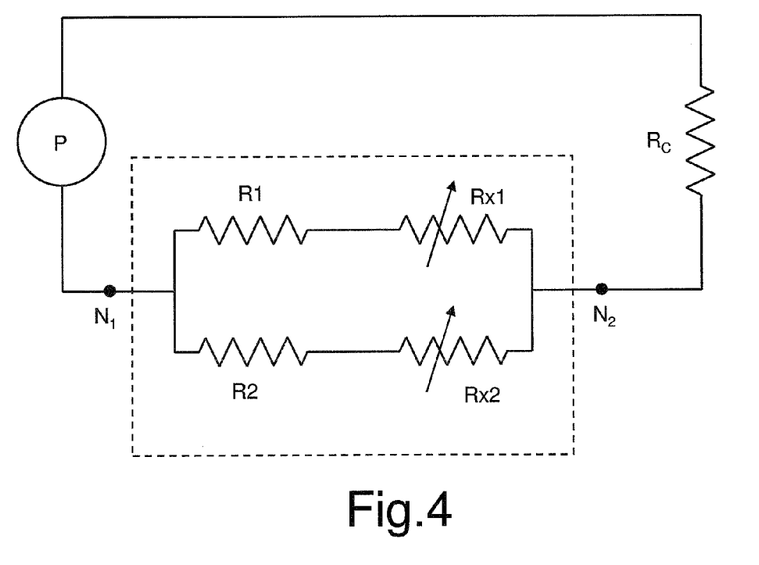
FIG. 4 shows a simplified equivalent hydraulic circuit related to the thermostatic valve in FIG. 2.

In FIG. 4, the external resistance R, associated with the resistance of the remaining portion of the equivalent hydraulic circuit and the pump P present in the same hydraulic circuit is also indicated.

In the light of the foregoing considerations, it is desirable that the following conditions occur:

$$\Delta Y = \text{constant; and}$$

$$Q = Q1 + Q2 = \text{constant},$$

where ΔY represents the overall load loss defined by the thermostatic valve 14 between nodes N1 and N2; Q indicates the total flow rate between nodes N1 and N2, supplied at output from the thermostatic valve 14; Q1 is the flow rate of the cold branch and Q2 is the flow rate of the hot branch.

Furthermore:
R1 is assumed to be known (given that the configuration of the hydraulic circuit is known); and
R2=R1, so as not to have imbalance between the hot and cold branches.

The coefficients $k_{t1}$ and $k_{t2}$ of the load losses of the variable resistances Rx1 and Rx2 are also defined:

$$k_{t1} = \tfrac{1}{2} \cdot (1-z_1) + (1-z_1)^2$$

$$k_{t2} = \tfrac{1}{2} \cdot (1-z_2) + (1-z_2)^2$$

where:
z1 is the ratio between the useful passage section $S_{f1}$ and the whole section S1 of the first opening 30a associated with the cold branch; and
z2 is the ratio between the useful passage section $S_{f2}$ and the whole section S2 of the second opening 30b associated with the hot branch.

Considering, as a working hypothesis, the cold branch completely open and the hot branch completely closed (entire flow through just the cold branch), i.e. considering that the adjustment baffle 32 is in the first angular position (shown in FIG. 3), it is possible to identify the following relation for the overall load loss ΔY between nodes N1 and N2:

$$\Delta Y = \frac{1}{2} \cdot \frac{k_1}{g} \cdot v_1^2 + \frac{1}{2} \cdot \frac{k_{t1}}{g} \cdot v_{t1}^2 = \frac{1}{2} \cdot \frac{k_1}{g} \cdot \left(\frac{Q_1}{S_1}\right)^2 + \frac{1}{2} \cdot \frac{k_{t1}}{g} \cdot \left(\frac{Q_1}{z_1 \cdot S_1}\right)^2 = \frac{1}{2g} \cdot \left(\frac{Q_1}{S_1}\right)^2 \cdot \left(k_1 + \frac{k_{t1}}{z_1^2}\right) = \frac{1}{2g} \cdot v_1^2 \cdot \left(k_1 + \frac{k_{t1}}{z_1^2}\right)$$

where:
$k_1$ is the load loss coefficient of resistance R1;
$v_1$ is the velocity of the fluid passing through resistance R1;
$v_{t1}$ is the velocity of the fluid passing through resistance Rx1; and
g is the average field (coinciding with the acceleration of gravity in the pure gravitational case).

The following expression is obtained from the above relation:

$$v_1^2 = \frac{2 \cdot g \cdot \Delta Y}{k_1 + \frac{k_{t1}}{z_1^2}}$$

In fact:

$$v_1 = \frac{Q_1}{S_1} \text{ and } v_{t1} = \frac{Q_{t1}}{z_1 \cdot S_1}$$

and given that, in this operating condition, $Q_1=Q_{t1}$ (where $Q_{t1}$ is the flow rate through resistance Rx1), the following is obtained:

$$v_{t1} = \frac{Q_{t1}}{z_1 \cdot S_1} = \frac{v_1 \cdot S_1}{z_1 \cdot S_1} = \frac{v_1}{z_1}$$

and therefore:

$$v_1 = v_{t1} \cdot z_1$$

By substituting in the previous expression, the following is obtained:

$$(v_{t1} \cdot z_1)^2 = \frac{2 \cdot g \cdot \Delta Y}{k_1 + \frac{k_{t1}}{z_1^2}}$$

thus giving:

$$v_{t1} = \sqrt{\frac{2 \cdot g \cdot \Delta Y}{k_{t1} + k_1 \cdot z_1^2}}$$

The flow rate in the useful passage section $S_{f1}$ is given by:

$$Q_{t1} = v_{t1} \cdot z_1 \cdot S_1$$

while the useful passage section $S_{f1}$ can be calculated with:

$$S_{f1} = z_1 \cdot S_1$$

By exploiting the above-mentioned relations (and similar relations related to the dual case, where the entire flow passes through just the hot branch) it is therefore possible to compile a spreadsheet and, through an iterative process, it is possible to calculate the value of the useful fluid passage sections $S_{f1}$ and $S_{f2}$ for each discretization step of the rotation angle α, which enables obtaining constant load losses for any choke angle of the adjustment baffle 32.

From the above-mentioned computations, it is also possible to derive expressions for the trends of the fluid passage sections as a function of the rotation angle α of the adjustment baffle 32.

In particular, it is found that the trend of the total useful passage section $S_{ft}$ for hot and cold electrolytic fluids ($S_{f1}+S_{f2}$) is governed by the following function:

$$y = a \cdot x^2 - b \cdot x + c$$

where:
x indicates the choke angle, or rotation angle α, of the adjustment baffle 32; and
y indicates the total passage section $S_{ft}$.

In particular, this trend is governed by the function:

$$y = 0.2078x^2 - 18.701x + 1010.4$$

It has also been determined that all the curves that fall within a 10% tolerance range about this function enable obtaining the desired results.

Therefore, the trend of the total passage section $S_{ft}$ is included between the following lower and upper limit trends (all the curves that fall within the tolerance range of +/−10%, and are thus included between these lower and upper limit curves, are suitable for use):

$$y = 0.2286x^2 - 20.571x + 1111.4 \text{ (upper limit curve); and}$$

$$y = 0.187x^2 - 16.831x + 909.32 \text{ (lower limit curve).}$$

Similarly, the function that governs the useful passage section $S_{f1}$ of just the cold electrolytic fluid can be obtained:

$$y = a \cdot x^3 - b \cdot x^2 + c \cdot x - d$$

In particular, this function is preferably given by:

$$y = 0.0016x^3 - 0.1104x^2 + 8.4726x - 7.5037$$

with the tolerance range defined by the following lower and upper limit trends:

$$y = 0.0017x^3 - 0.1215x^2 + 9.3198x - 8.2541 \text{ (upper limit curve); and}$$

$$y = 0.0014x^3 - 0.0994x^2 + 7.6253x - 6.7533 \text{ (lower limit curve).}$$

Furthermore, the function that governs the useful passage section $S_{f2}$ of just the hot electrolytic fluid is given by:

$$y = -a \cdot x^3 + b \cdot x^2 - c \cdot x + d$$

In particular, this function is preferably given by:

$$y = -0.0016x^3 + 0.3182x^2 - 27.173x + 1017.9$$

with the tolerance field defined by the following lower and upper limit trends:

$$y = -0.0017x^3 + 0.35x^2 - 29.891x + 1119.6 \text{ (upper limit curve); and}$$

$$y = -0.0014x^3 + 0.2864x^2 - 24.456x + 916.07 \text{ (lower limit curve).}$$

Figure 5:
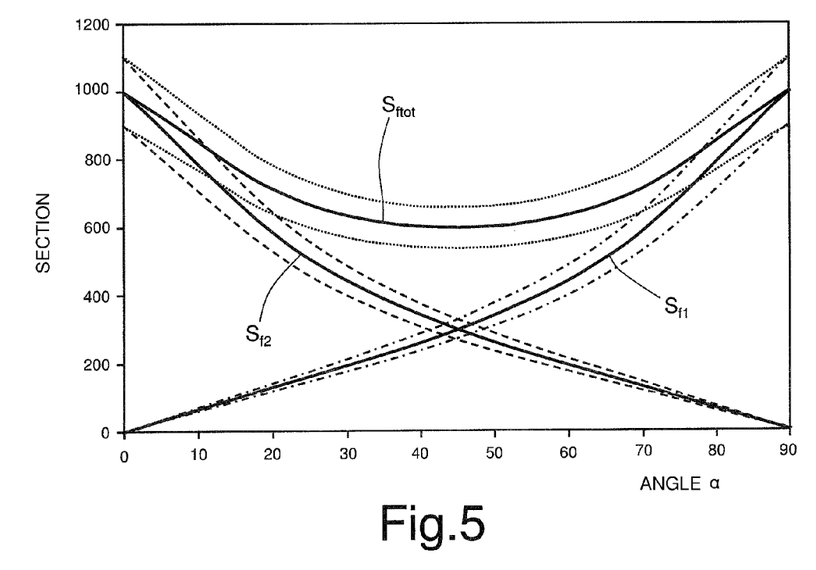
FIG. 5 shows plots related to the trend of fluid passage sections in the thermostatic valve, as the mixing operating conditions vary.

The plots in FIG. 5 show the trends of the useful passage sections of the cold electrolytic fluid $S_{f1}$ and of the hot electrolytic fluid $S_{f2}$ and the total useful section $S_{ftot}$, as a function of the rotation angle α of the adjustment baffle 32 (and therefore of the amount by which the thermostatic valve 14 is opened); the lower and upper limit curves for the same trends, defining bands around these limit curves, are also shown in FIG. 5.

The resulting perimeter of the openings 30a and 30b, in cross-section perpendicular to the longitudinal axis B, is shown in a possible embodiment in the above-mentioned FIG. 3.

In detail, in this case and making reference to FIG. 3, the perimeter comprises:
an arc of a circle 40a, close to the centre O, having a first radius $r_1$ (greater than the radius of the rotating shaft 34 to which the adjustment baffle 32 is coupled) and an angular extension of substantially 90°;
a first radial segment 40b, which extends radially from a first end of the arc of a circle 40a, for a first extension $d_1$;
a second radial segment 40c, which extends radially from a second end of the arc of a circle 40a, for a second extension $d_2$, greater than the first extension $d_1$, substantially up to the internal wall of the valve body 15; and
a connecting arc 40d, which connects the ends of the radial segments 40b and 40c that are not coupled to the arc of a circle 40a.

In this embodiment, the adjustment baffle 32 is a disc portion with radius R (substantially equal to the internal radius of the cylindrical portion of the valve body 15), and has, in the same cross-section perpendicular to the longitudinal axis B, a profile defined by:
a first arc of a circle 42a, with second radius $r_2$ (greater than the radius of the rotating shaft 34 to which the adjustment baffle 32 is coupled, and less than the first radius $r_1$ of the arc of a circle 40a of the opening 30a), and with an angular extension comprised between 90° and 180°, and close to 90° in the example;

a respective first radial segment 42b, which extends radially from a first end of the arc of a circle 42a, substantially up to the end of the radius R of the adjustment baffle 32 and up to the inner wall of the valve body 15;

a respective second radial segment 42c, which extends radially from a second end of the arc of a circle 42a, substantially up to the end of the radius R of the adjustment baffle 32, angularly spaced apart with respect to the first radial segment; and a second arc of a circle 42d, with radius $r_3$ substantially equal to the radius R of the adjustment baffle 32, which connects the ends of the first and second radial segments 42b and 42c that are not joined to the first arc of a circle 42a.

As shown in FIG. 3, in the first angular position, the first radial segment 42b of the adjustment baffle 32 is arranged at the first radial segment 40b of section $S_2$ of the second opening 30b, in contact with a first lateral wall of the stop member 36.

Similarly, in the second angular position (not shown), the second radial segment 42c of the adjustment baffle 32 is arranged at the first radial segment 40b of section $S_1$ of the first opening 30a, in contact with a second lateral wall of the stop member 36, opposite to the first lateral wall.

The advantages of the described solution clearly emerge from the foregoing description.

In any case, it is again underlined that this solution enables providing effective temperature regulation of the electrolytic fluid entering an electrochemical power source, even in situations of high variability in operating conditions (for example, as the amount of power required by the operating conditions varies from time to time, or as the operating depth varies).

In fact, this improved type of thermostatic valve 14 enables avoiding fluctuations in the flow rate entering electrochemical block 4, which could create problems, for example, in the operation of the recirculation pump 25, which, in this way, will instead find itself working with the same hydraulic resistance in all operating conditions.

Finally, it is clear from what set forth herein, that modifications and variants can be made without departing from the scope of the present invention, as defined in the appended claims.

In particular, it is again underlined that the present solution is advantageously applicable to control of a generic thermostatic valve for use in a marine environment, for example inside a generic underwater vehicle, which could also be different from a torpedo or a UAV to which reference has been previously made, such as an underwater probe or a sounding device for example.

Moreover, the structure of the thermostatic valve and the shape of the associated openings for passage of the electrolytic fluid could be different from what previously shown.

The invention claimed is:

1. A thermostatic valve designed to be coupled to an electrochemical power source in a marine environment, the thermostatic valve comprising:
    a valve body;
    a first fluid inlet designed to receive an electrolytic fluid at a first temperature;
    a second fluid inlet designed to receive an electrolytic fluid at a second temperature that is lower than the first temperature;
    an outlet designed to supply a mixed electrolytic fluid, resulting from mixing of the electrolytic fluids at the first and second temperatures; and
    regulating means controllable to adjust the mixing;
    wherein the valve body internally defines a first opening, in fluid communication with the second fluid inlet and designed to allow passage of the electrolytic fluid at the second temperature, and a second opening, in fluid communication with the first fluid inlet and designed to allow passage of the electrolytic fluid at the first temperature;
    wherein the regulating means includes an adjustment baffle, interposed between the first and second openings, and the outlet, and rotatably drivable to vary a respective useful passage section of the first and second openings, thereby adjusting the mixing;
    wherein the first and second openings are configured to allow mixing of the electrolytic fluids at the first and second temperatures with different flow rates, upon variation of a rotation angle of the adjustment baffle, maintaining the flow rate and introduced load losses substantially unvaried.

2. The thermostatic valve according to claim 1, wherein the regulating means includes an actuator designed to drive the adjustment baffle to rotate about a rotating shaft, so as to cause the opening or the closing of either the first opening or the second opening, and correspondingly the closing or the opening of the other of the first opening or the second opening.

3. The thermostatic valve according to claim 1, wherein a total useful passage section, defined by the set of the first and second openings, has a trend with the variation of the rotation angle of the adjustment baffle, comprised between an upper limit curve, given by the following expression:

$$y=0.2286x^2-20.571x+1111.4$$

and a lower limit curve, given by the following expression:

$$y=0.187x^2-16.831x+909.32$$

wherein x indicates the rotation angle of the adjustment baffle and y indicates the total useful passage section.

4. The thermostatic valve according to claim 3, wherein the total useful passage section is defined by the following expression:

$$y=0.2078x^2-18.701x+1010.4.$$

5. The thermostatic valve according to claim 1, wherein the useful passage section of the first opening has a trend with the variation of the rotation angle of the adjustment baffle, comprised between a first upper limit curve, given by the following expression:

$$y=0.0017x^3-0.1215x^2+9.3198x-8.2541$$

and a lower limit curve, given by the following expression:

$$y=0.0014x^3-0.0994x^2+7.6253x-6.7533$$

wherein x indicates the rotation angle of the adjustment baffle and y indicates the useful passage section of the first opening.

6. The thermostatic valve according to claim 5, wherein the useful passage section of the first opening is defined by the following expression:

$$y=0.016x^3-0.1104x^2+8.4726x-7.5037.$$

7. The thermostatic valve according to claim 1, wherein the useful passage section of the second opening has a trend with the variation of the rotation angle of the adjustment baffle, comprised between an upper limit curve, given by the following expression:

$$y=-0.0017x^3+0.35x^2-29.891x+1119.6$$

and a lower limit curve, given by the following expression:

$$y=-0.0014x^3+0.2864x^2-24.456x+916.07$$

wherein x indicates the rotation angle of the adjustment baffle and y indicates the useful passage section of the second opening.

8. The thermostatic valve according to claim 7, wherein the useful passage section of the second opening is defined by the following expression:

$$y=-0.0016x^3+0.3182x^2-27.173x+1017.9.$$

9. The thermostatic valve according to claim 1, wherein:
the valve body has a cylindrical conformation with a longitudinal axis;
the first and second openings have, in a section generally orthogonal to the longitudinal axis, respective whole passage sections generally symmetrical with respect to a diametrical axis of the valve body; and
each of the whole passage sections is defined by a perimeter including,
  an arc of a circle, having a first radius and angular extension of substantially 90°;
  a first radial segment, which extends starting from a first end of the arc of a circle, for a first extension;
  a second radial segment, which extends starting from a second end of the arc of a circle, for a second extension, greater than the first extension, substantially up to an internal wall of the valve body; and
  a connecting arc, which connects ends of the first and of the second radial segments that are not coupled to the arc of a circle.

10. The thermostatic valve according to claim 9, wherein the adjustment baffle has, in the section generally transverse to the longitudinal axis, a shape defined by a respective perimeter including,
  a first arc of a circle, with a second radius, less than the first radius of the arc of a circle of the whole passage section, and with an angular extension comprised between about 90° and about 180°;
  a respective first radial segment, which extends starting from a first end of the first arc of a circle, substantially up to the internal wall of the valve body;
  a second radial segment, which extends starting from a second end of the arc of a circle, substantially up to the internal wall of the valve body; and
  a second arc of a circle, which connects the ends of the respective first and second radial segments that are not coupled to the first arc of a circle.

11. An electrochemical power source for use in a marine environment, the electrochemical power source comprising:
a thermostatic valve according to claim 1; and
an electrochemical block operatively coupled to the thermostatic valve.

12. The electrochemical power source according to claim 11, further comprising:
a supply duct for supplying electrolytic fluid at the first temperature, from the electrochemical block towards the first fluid inlet of the thermostatic valve; and
a supply duct for supplying electrolytic fluid at the second temperature towards the second fluid inlet of the thermostatic valve;
wherein the outlet of the thermostatic valve is coupled to a fluid inlet of the electrochemical block by an outlet duct.

13. The electrochemical power source according to claim 11, further comprising:
a control unit configured to,
  receive a reference temperature signal;
  receive a temperature measurement signal from a temperature sensor coupled to the outlet of the thermostatic valve; and
  execute a control algorithm for the regulating means, so as to reduce an error between the temperature measurement signal and the reference temperature signal.

14. An underwater vehicle comprising the electrochemical power source according to claim 11.

15. The underwater vehicle according to claim 14, further comprising:
a tubular body having a longitudinal extension axis, including a central section inside which a chamber is defined, the chamber housing the electrochemical block and designed to be filled with sea water, operating as electrolytic fluid;
wherein the central section also defines a first tank and a second tank, designed to contain electrolytic fluid at the first and, respectively, at the second temperature; and
wherein the first fluid inlet of the thermostatic valve is fluidically coupled to the first tank;
wherein the second fluid inlet of the thermostatic valve is fluidically coupled to the second tank; and
wherein the outlet of the thermostatic valve is fluidically coupled to a fluid inlet of the electrolytic block.

* * * * *

UNITED STATES PATENT AND TRADEMARK OFFICE
CERTIFICATE OF CORRECTION

PATENT NO.        : 9,450,227 B2                                    Page 1 of 1
APPLICATION NO.   : 14/935234
DATED             : September 20, 2016
INVENTOR(S)       : Francesco Lo Presti It is certified that error appears in the above-identified patent and that said Letters Patent is hereby corrected as shown below:

On the Title Page

Item (73) Assignee, please replace "WHITEHEAD SISTEMI SUBACQUERI S.P.A." with
-- WHITEHEAD SISTEMI SUBACQUEI S.P.A. --

Signed and Sealed this
Twenty-fifth Day of April, 2017

Michelle K. Lee
*Director of the United States Patent and Trademark Office*